O. C. TRAVER.
PROTECTIVE SYSTEM.
APPLICATION FILED OCT. 17, 1919.
1,341,486.
Patented May 25, 1920.
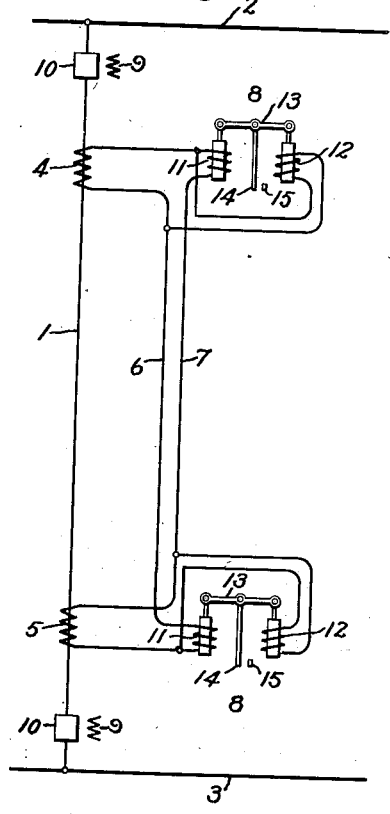
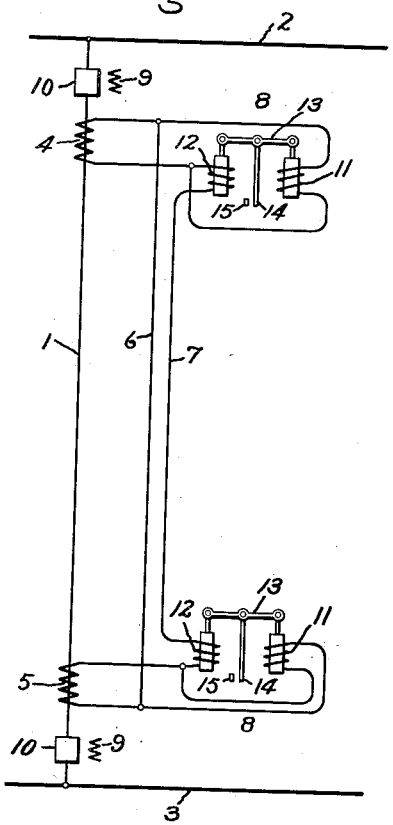
Inventor:
Oliver C. Traver,
by Albert G. Davis
His Attorney.

UNITED STATES PATENT OFFICE.

OLIVER C. TRAVER, OF SCHENECTADY, NEW YORK, ASSIGNOR TO GENERAL ELECTRIC COMPANY, A CORPORATION OF NEW YORK.

PROTECTIVE SYSTEM.

1,341,486.   Specification of Letters Patent.   Patented May 25, 1920.

Application filed October 17, 1919. Serial No. 331,355.

*To all whom it may concern:*

Be it known that I, OLIVER C. TRAVER, a citizen of the United States, residing at Schenectady, in the county of Schenectady, State of New York, have invented certain new and useful Improvements in Protective Systems, of which the following is a specification.

My invention relates to protective systems, particularly to systems of protecting electric feeders or transmission lines and has for its object to provide a system of protection for electric feeders, of the pilot wire type in which compensation is made for the effect of capacity current, the impedance of the pilot wire circuit and differences in transformer characteristics.

In protective systems of the pilot wire type in which transformers are connected at opposite ends of an electric conductor, feeder or transmission line with their secondaries connected in a separate or pilot wire circuit, it is customary to connect relays or circuit controlling devices, such as trip coils, etc., in the pilot wire circuit which operate to open one or both ends of the feeder when a fault occurs between the ends of the feeder protected. On such systems, however, erroneous operation of such devices have occurred due to the impedance of the pilot wire circuit, the capacity current set up in the pilot wire circuit and also due to unbalanced transformer current in the pilot wire circuit caused by differences in the characteristics of the transformers at the two ends of the feeder. These differences in transformer characteristics cause little unbalanced current in the pilot wire circuit under normal conditions but upon excessive currents passing through the ends of the feeder in the same direction due, for instance, to a short circuit or fault at some point on the system beyond the feeder protected, then with several times normal current, the difference in transformer characteristics causes an unbalanced current to flow which is sufficient to operate the control devices.

According to my invention, these limitations are overcome by providing in the pilot wire circuit, relays or circuit controlling devices comprising an electroresponsive operating element, and means coöperating with the operating element to prevent its operation of the control device due to capacity current, unbalanced transformer current or that due to the impedance of the pilot wire circuit. This means comprises a second electroresponsive element so related to the pilot wire circuit that its effect predominates to compensate for the conditions noted above.

The novel feature which I believe to be characteristic of my invention will be definitely indicated in the claims appended hereto, while the features of construction and mode of operation will be understood by reference to the following description taken in connection with the accompanying drawing, which shows the preferred embodiment of my invention and in which:

Figures 1 and 2 show diagrammatically, in one line diagram only, for the purpose of clearness, an electric feeder or transmission line protected by a system embodying my invention.

In Figs. 1 and 2, the conductor or feeder 1, to be protected, is shown connected between two lines 2 and 3 which may be the buses at two stations or feeders on an interconnecting transmission network. At each end of the feeder 1 are connected transformers 4 and 5. As is the custom in pilot wire systems, the secondaries of transformers 4 and 5 are connected by pilot wires 6 and 7 to form an electrical or pilot wire circuit. In such a pilot wire circuit, the transformer secondaries may be connected in series relation or in opposed relation but my invention is applicable to both connections.

In Fig. 1, I have shown the transformer secondaries connected by pilot wires 6 and 7 in opposed or bucking relation. In this arrangement no current normally flows in the pilot wires. In Fig. 2, I have shown the transformer secondaries as connected by pilot wires 6 and 7 in series relation. In this relation, the normal secondary current flows through the circuit. Independent of the manner of connecting the transformer secondaries in the pilot wire circuit, I provide at each end of the feeder to be protected, a circuit controlling device which may be a relay 8 controlling a trip coil 9 for a switch 10 or a tripping device acting to directly trip the switch. These circuit controlling devices 8 consist of electroresponsive operating elements or coils 11, which, in Fig. 1, are connected in series with the transformer secondaries 4 and 5 and normally receive no current except that due to unbalanced transformer characteristics and capacity effect, while in Fig. 2 the operating elements are connected in shunt to the transformer secondaries 4 and 5 and normally receives that current due to impedance of the pilot wires and to unbalanced transformer characteristics, but little circulating current. In order to compensate for impedance of the pilot wire circuit, capacity current and unbalanced transformer current in the pilot wire circuit, I provide compensating means which acts to restrain the circuit controlling devices and prevent their operation due to the above conditions. This restraining or compensating means consists of a second electroresponsive element or coil 12 which acts to oppose the action of coil 11 and restrain the operation of the control devices under certain conditions. These restraining coils 12 are connected to the pilot wire circuit in such a manner as to be normally energized as long as currents through the transformers 4 and 5 are equal and in the same direction but are rendered ineffective when the currents through the transformers are in the same direction but unequal, or when the currents through the transformers are in opposite directions. In Fig. 1, therefore, the restraining coils 12 are connected in shunt to the transformer secondaries 4 and 5 while in Fig. 2, the coils are connected in series with the transformer secondaries 4 and 5. The control devices 8 comprise therefore two coils, an operating and a restraining coil, one in series and the other in shunt to the transformer secondaries, the operating coil being in shunt or series dependent upon the connection of the transformer secondaries in the pilot wire circuit.

In both figures of the drawing, I have shown the circuit controlling device 8 as a relay having two independent operating and restraining elements 11 and 12 mechanically interconnected, the elements being connected at opposite ends of a balanced arm 13 to control contacts 14 and 15 of a tripping circuit, not shown, for the switch 10. This arrangement of the elements 11 and 12 is illustrative of the preferred way in which they may be combined to form a relay, but it is understood that the elements may be operated in other ways to form a relay which will operate satisfactorily.

The operation of my protective system is as follows: In the arrangement of Fig. 1, there is no current normally flowing in the pilot wires 6 and 7 as the secondaries of transformers 4 and 5 are connected opposed. The operating coils or elements 11 being in series with transformer secondaries receive normally no transformer current. Assume a fault develops intermediate the ends of feeder 1, then current flows from both ends of the feeder to the fault and the induced current in the secondaries of transformers 4 and 5 are in opposite directions which due to the opposed connection of the secondaries causes a current to circulate through the pilot wires 6 and 7. This current energizes operating coils 11 for each relay 8, and the restraining coils 12 being in shunt to the transformer secondaries and of high impedance receive relatively little current and hence provide a small restraining force relative to the force exerted by the operating coil. The relays 8 operate therefore to open the switches 10 at both ends of the feeder. Assume now that instead of the fault occurring in the feeder 1 that such a condition occurs in the system at some point beyond feeder 1. In this case excessive current will pass over feeder 1 and equal currents will pass through both ends of the feeder in the same direction. The potential induced in the transformer secondaries 4 and 5 increase as the feeder current increases but these potentials are opposed. If there is any difference however, in the characteristics of the transformers 4 and 5, the effect of this difference will be increased by the increase in load current so that a resultant potential will be produced in the pilot wire circuit which is the difference between the transformer potentials induced at each end of the feeder, which potential will force a current through the operating coils 11 of the relays tending to cause them to operate. The current produced by the unbalanced potential, however, is compensated for by the restraining coils 12 connected in shunt to each transformer secondary 4 and 5. Under the conditions noted above, the current increases in the restraining coils 12 which are in shunt to the transformer secondaries substantially proportional to the increase in feeder current so that, although the operating coils 11 receive the amount due to resultant transformer potential, the restraining coils 12 receive a proportionately greater increase of current or that increase in current which passes through the transformer at its end of the feeder. The restraining coils, therefore, predominate and the relays 8 are prevented from operating. The effect of capacity current in the pilot wires 6 and 7 is also compensated for by restraining coils 12 as the capacity current increases with load current and as the force exerted by the restraining coils 12 increases with load current, the tendency to operate due to capacity current will be counteracted by the restraining coils 12 and operation of the relays will be prevented. If the fault is such that the currents through transformers 4 and 5 are in the same direction but unequal, the difference of the currents is forced through the operating coils, and if the difference is great enough, will cause the operating coils to overcome the restraining coils and operate the relays.

In the sketch of Fig. 2 the normal transformer current is circulating through the pilot wires 6 and 7 under normal conditions as the secondaries of transformers 4 and 5 are connected in series. In this arrangement, the restraining coils 12 are in series with the secondaries and hence receive the circulating current. The operating coils 11 are in shunt to their respective transformer secondaries and receive normally little current except that due to impedance of the pilot wires and unbalanced transformer characteristics. Under conditions of fault intermediate the ends of the feeders, the current from each end of the pilot wire oppose each other and the current from each transformer is forced through the shunt circuit including the operating coil causing the relays to operate. Under current conditions causing an excess current to pass through feeder, the effect of differences in transformer characteristics and the impedance of the pilot wires is compensated for by the increasing effect of the restraining coils 12 to cause them to predominate. Similarly, the restraining coils operate to compensate for the impedance of the pilot wire circuit. As stated above, if the fault is such as to cause the current through transformers 4 and 5 to be in the same direction but unequal, then the difference in current will be forced through the operating coils, and, if great enough, will overcome the restraining coils and operate the relay.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:

1. In a protective system for an electrical conductor, the combination with transformers at each end of said conductor having their secondaries connected in a common electrical circuit, and control devices at each end of said conductor each comprising two independent electroresponsive elements, one element predominating when the current flow through said transformers is substantially equal and in the same direction, the other element predominating when the current flow through said transformers is in opposite directions and when the current flow through said transformers is in the same direction but unequal.

2. In a protective system for an electrical conductor, the combination with transformers at each end of said conductor having their secondaries connected in an electrical circuit, and control devices at each end of said conductor each comprising an electroresponsive element in said circuit normally receiving current due to the impedance and capacity of said circuit and that due to unbalanced transformer characteristics, a second independent electroresponsive element in said circuit normally overcoming the effect of said first element but rendered ineffective when the current flow through said transformers is unequal but in the same direction and when the current flow through said transformers is in opposite directions, and mechanical means interconnecting said elements movable to operative position in response to said first element.

3. In a protective system for an electrical conductor, the combination with transformers at each end of said conductor having their secondaries connected in an electrical circuit, and control devices at each end of said conductor each comprising two independent electroresponsive elements connected in said circuit, and mechanical means interconnecting said elements, one of said elements operating to move said mechanical means to operative position, the other of said elements overcoming the effect of the first element as long as the current flow through said transformers is substantially equal and in the same direction.

4. In a protective system for an electrical conductor, the combination with transformers at each end of said conductor having their secondaries connected in an electrical circuit, and control devices at each end of said conductor each comprising two mechanically balanced electroresponsive elements connected in said circuit, one of said elements adapted to operate said device, and the other element adapted to normally overcome said operating element to compensate for the effect of capacity current therein and that due to impedance and unbalanced transformer characteristics.

5. In a protective system for an electrical conductor, the combination with transformers at each end of said conductor having their secondaries connected in an electrical circuit, and control devices at each end of said conductor each comprising two electroresponsive elements connected in said circuit, a balanced arm connecting said elements, one of said elements acting to operate said device when the currents through said transformers are in the same direction and unequal and when the current flow through said transformers is in opposite directions, the other element adapted to normally overcome said first mentioned element to compensate for the effect of capacity current and that due to impedance and unbalanced transformer characteristics.

In witness whereof, I have hereunto set my hand this 2nd day of October, 1919.

OLIVER C. TRAVER.